Dec. 1, 1959 W. I. WORKMAN 2,915,345

FLUID SEAL

Filed June 8, 1956

United States Patent Office 2,915,345
Patented Dec. 1, 1959

2,915,345

FLUID SEAL

Woodrow I. Workman, Bristol, N.H., assignor to International Packings, Inc., Bristol, N.H., a corporation of Massachusetts Application June 8, 1956, Serial No. 590,172

3 Claims. (Cl. 308—187.2)

This invention relates to fluid seals adapted to be interposed directly between a rotating shaft and a housing through which the shaft projects for establishing a fluid tight seal between said housing and said shaft, and more particularly, to a fluid seal adapted for non-removable assembly with an antifriction bearing and housing such as may be used as a pillow block bearing, for example.

The importance of lubrication of antifriction bearings, such as ball bearings as used in pillow block bearings, has led to an increasing use of fluid seals adapted to maintain a quantity of lubricant in the bearing and prevent its loss from the bearing housing through leakage along the shaft or the housing wall. The most common form of such seals in use today is that comprising an annular metal member which may be press fitted into a housing and an annular flexible rubberlike sealing member, usually vulcanized to the metal member, which has an inner sealing lip in wiping contact with the shaft. In installing such seals, it is necessary that they be presed into the houing under considerable pressure to accomplish a secure and leak-tight fit between the seal and the housing. Hence, when it is necessary, in service, to remove a seal, difficulty is generally encountered, and damage, particularly to the flexible wiping edge, frequently occurs. Such damage, however, may not be readily apparent, and a damaged seal may be reinstalled and thereafter permit escape of lubricating fluid until bearing failure occurs.

Accordingly, it is an object of the present invention to provide a fluid seal cooperating with a housing so that such seal cannot be removed without destroying it so that it cannot possibly be reinserted in the housing. Hence, since a new seal must be used in reassembly, the chance of bearing failure due to a faulty seal is greatly reduced.

It is another object of the invention to provide a fluid seal which does not require extraordinarily high pressures for press fitting it into a housing, and yet which is positively retained therein, so that it cannot be blown out by excess pressures applied when lubricating the assembly through its grease fitting.

It is still another object of the invention to provide a fluid seal having a construction enabling it to retain a reservoir of lubricating fluid adjacent a bearing so that the frequent lubrication of the bearing assembly is unnecessary.

It is yet another object of the invention to provide a novel bearing and housing assembly having non-removable fluid seals for retaining lubricant therein.

For the purpose of disclosing a preferred embodiment of the invention, reference is now made to the following specification together with the accompanying drawings, wherein.

Figure 1:
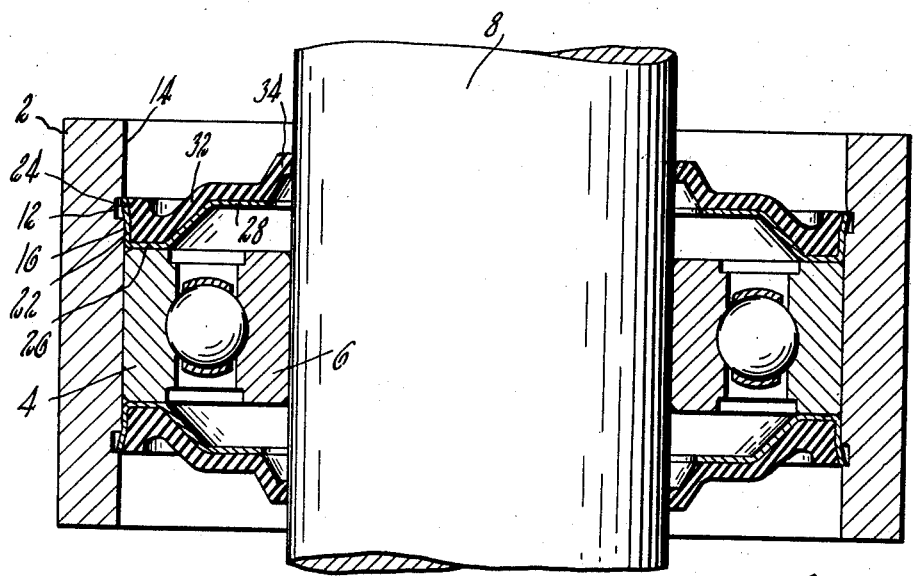
Fig. 1 is a cross-sectional side view of the novel fluid seal of the invention showing a pair thereof assembled with a cooperating housing and bearing to provide a novel bearing assembly for a shaft extending therethrough.

Referring to the drawings, in Fig. 1 is shown a cylindrical bearing housing 2 having mounted centrally within its cylindrical bore the outer race 4 of a ball bearing with its inner race 6 mounted on shaft 8 extending axially through the housing 2. In said bore of said housing, spaced somewhat inwardly from each of its outer ends, is a peripheral groove 12, the diameter of the housing bore 14 at the outer ends thereof between each of said grooves and its adjacent end being of a somewhat greater diameter than that of the central inside bore 16 between the grooves on the sides thereof adjacent bearing outer race 4 and on which central bore said bearing race may be mounted. Groove 12 has its outside wall adjacent bore 14 extending perpendicular to the axis of said bore to provide an annular flat surface.

My novel non-removable one-piece fluid seal is adapted to be interposed directly between central shaft 8 and its surrounding housing 2 on each side of the bearing and includes an annular sheet metal member having an outer generally cylindrical tubular rim 22, with a radially outwardly extending flaring bowed portion 24 at the free end of said rim away from the ball bearing with a flat annular free end surface, and with a radially inwardly extending flange at the other end of tubular rim 22 adjacent the bearing outer race 4. Said flange includes an annular outer portion 26 extending radially inwardly perpendicular to tubular rim 22 and an annular inner portion 28 bent away from the plane of outer portion 26 toward the free end of rim 22 and extending radially inwardly toward the axis of said sheet metal member to provide a lubricating fluid retaining pocket between the seal and the bearing. Bonded to the surfaces of the sheet metal member radially inwardly of its outer peripheral surface to provide a one-piece construction is a flexible rubberlike molded sealing element 32 having its inner sealing or wiping lip 34 extending radially inwardly toward the center or axis of the sheet metal member beyond the inner portion 28 of the sheet metal flange into sealing contact with shaft 8. The annular free end surface of bowed portion 24, however, is kept free of molded rubber-like material.

Figure 3:
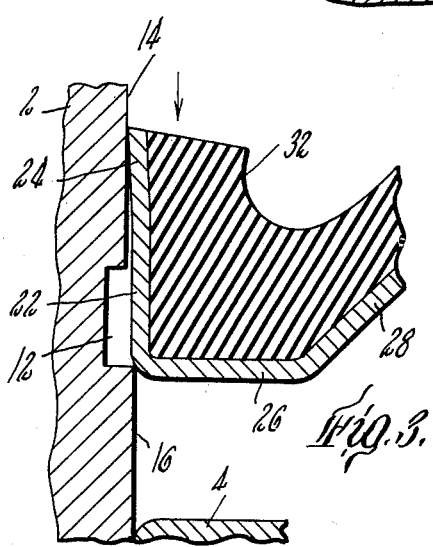
Fig. 3 is an enlarged view of a portion of the fluid seal and the housing of Fig. 1 showing the two elements partially assembled.
Figure 2:
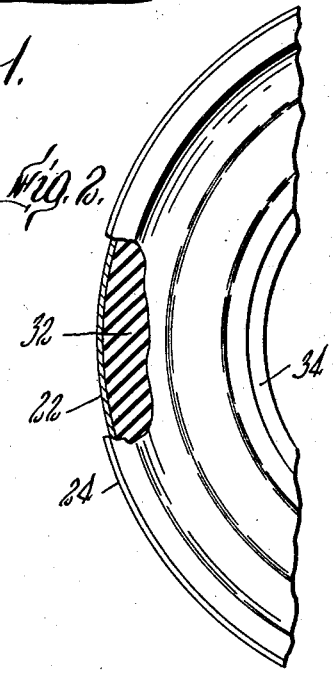
Fig. 2 is a plan view, partially in cross-section and broken away, of the fluid seal of Fig. 1.
Figure 4:
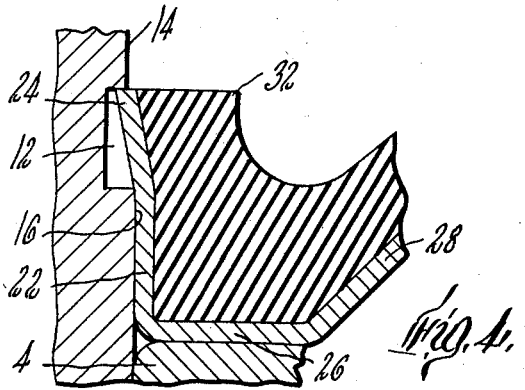
Fig. 4 is an enlarged view of a portion of the fluid seal and the housing of Fig. 1 showing the two elements in assembled relation.

In order to retain my novel fluid seal and prevent its removal without destroying it, the tubular rim 22 of the sheet metal member has an outside diameter somewhat greater than the diameter of the central housing bore 16 on the side of groove 12 adjacent the bearing and somewhat less than the diameter of the outer housing bores 14 on the outside of grooves 12 away from the bearing. Thus, when a fluid seal is pressed into the housing 2 (Fig. 3), the bowed portion 24 of rim 22 will be bent inwardly by the outer housing bore 14 and the rim 22 itself will clear the outer housing bore 14. When said rim contacts the housing central or inner bore 16, more force will be necessary for the pressing operation since, as its rim diameter is larger than that of the bore, an interference fit will be provided. As the elements are pressed further together (Fig. 4), the flat free end of rim portion 24 will spring into groove 12 as soon as it clears outer housing bore 14, with said free end in contact with the outside wall of groove 12 thereafter preventing any rearward movement because of the wedging action of said free end against said wall tending to urge said free end radially outwardly and so wedge itself even more deeply into said groove upon application of force tending to withdraw it, and sheet metal member flange 26 will act as a stop against outer race 4 to prevent any further forward movement, locking the seal in position by virtue of the spacing between the adjacent surface of outer bearing race 4 and the outside wall of groove 12 being substantially equal to but no less than the overall distance between flange 26 and the free end surface of its rim portion 24.

Thus, it will be seen that my invention provides a novel non-removable fluid seal as well as one which is easily and positively assembled within a housing on each side of an antifriction bearing retained therein to provide a novel bearing assembly which has a reservoir of lubricating fluid adjacent the bearing on each side thereof. Various modifications of my invention within the spirit thereof and the scope of the appended claims will occur to those skilled in the art.

I claim:

1. In combination with a central shaft and a surrounding cylindrical housing, a non-removable one-piece fluid seal interposed directly between said shaft and said housing, said housing having a peripheral groove with at least one wall having a flat surface perpendicular to the axis of said shaft and housing and having dissimilar diameter on opposite sides of said groove with the larger of said diameters on said groove adjacent said one wall, and said seal comprising an annular sheet material member with an outer generally cylindrical tubular rim having an outside tubular diameter less than said housing diameter adjacent said one wall and greater than said opposite housing diameter to provide an interference fit with said opposite housing diameter with an outwardly extending flanged bowed portion at the free end of said rim having its annular free end surface positioned in said groove with said free end surface adjacent said one wall, said free end having a diameter greater than said housing diameter adjacent said one wall adapted to spring into said groove to retain said seal in said housing when said seal has been pressed into said housing to engage said tubular rim with said opposite housing diameter and said outwardly extending bowed portion with said groove, and a flexible rubber-like molded sealing element vulcanized to the surfaces of said sheet metal member radially inwardly of its outer peripheral surface and free end surface and having an inner sealing lip extending radially inwardly toward the center of said sheet metal member into sealing contact with said shaft.

2. In combination with a central shaft and a surrounding cylindrical housing, a non-removable one-piece fluid seal interposed directly between said shaft and said housing, said housing having a peripheral groove with at least one wall having a flat surface perpendicular to the axis of said shaft and housing and having dissimilar diameters on opposite sides of said groove with the larger of said diameters on said groove adjacent said one wall, and said seal comprising an annular sheet material member with an outer generally cylindrical tubular rim having an outside tubular diameter less than said housing diameter adjacent said one wall and greater than said opposite housing diameter to provide an interference fit with said opposite housing diameter with an outwardly extending flanged bowed portion at the free end of said rim having its annular free end surface positioned in said groove with said free end surface adjacent said one wall, said free end having a diameter greater than said housing diameter adjacent said one wall adapted to spring into said groove to retain said seal in said housing when said seal has been pressed into said housing to engage said tubular rim with said opposite housing diameter and said outwardly extending bowed portion with said groove, and a radially inwardly extending flange at the other end of said rim positioned adjacent said bearing, said flange including an annular outer portion extending radially inwardly from said rim portion and an annular inner portion bent away from the plane of said outer portion in a direction toward the other end of said rim portion and extending radially inwardly to provide a lubricating fluid retaining recess, and a flexible rubber-like molded sealing element vulcanized to the surfaces of said sheet metal member radially inwardly of its outer peripheral surface and said free end surface and having an inner sealing lip extending radially inwardly toward the center of said sheet metal member and beyond said inner portion of said flange into sealing contact with said shaft.

3. In combination with a central shaft, a surrounding cylindrical housing and a bearing positioned therebetween, a non-removable one-piece fluid seal interposed directly between said shaft and said housing, said housing having a peripheral groove with at least one wall having a flat surface perpendicular to the axis of said shaft and housing and having dissimilar diameters on opposite sides of said groove with the larger of said diameters on said groove adjacent said one wall, and said seal comprising an annular sheet material member with an outer generally cylindrical tubular rim having an outside tubular diameter less than said housing diameter adjacent said one wall and greater than said opposite housing diameter to provide an interference fit with said opposite housing diameter with an outwardly extending flanged bowed portion at the free end of said rim having a flat annular free end surface perpendicular to the axis of said shaft and housing positioned in said groove with said free end surface adjacent said one wall, said free end having a diameter greater than said housing diameter adjacent said one wall to spring into said groove to retain said seal in said housing when said seal has been pressed into said housing to engage said tubular rim with said opposite housing diameter and said outwardly extending bowed portion with said groove, and with a radially inwardly extending flange at the other end of said rim positioned adjacent said bearing, said flange including an annular outer portion extending radially inwardly from said rim portion to provide a bearing contacting stop when said free end surface is positioned adjacent with said one groove wall and an annular inner portion bent away from the plane of said outer portion in a direction toward the other end of said rim portion and extending radially inwardly to provide a lubricating fluid retaining recess, and a flexible rubber-like molded sealing element vulcanized to the surfaces of said sheet metal member radially inwardly of its outer peripheral surface and said free end surface and having an inner sealing lip extending radially inwardly toward the center of said sheet metal member and beyond said inner portion of said flange into sealing contact with said shaft.

References Cited in the file of this patent

UNITED STATES PATENTS

| 1,927,534 | Wooler | Sept. 19, 1933 |
| 2,000,276 | Delaval-Crow | May 7, 1935 |
| 2,310,607 | Batesole | Feb. 9, 1943 |
| 2,405,122 | Firth | Aug. 6, 1946 |
| 2,621,091 | Hickling | Dec. 9, 1952 |

FOREIGN PATENTS

| 580,435 | Great Britain | Sept. 6, 1946 |
| 156,499 | Australia | May 14, 1954 |